W. J. & A. H. McCOY.
Moth-Traps for Bee-Hives.
No. 151,414. Patented May 26, 1874.
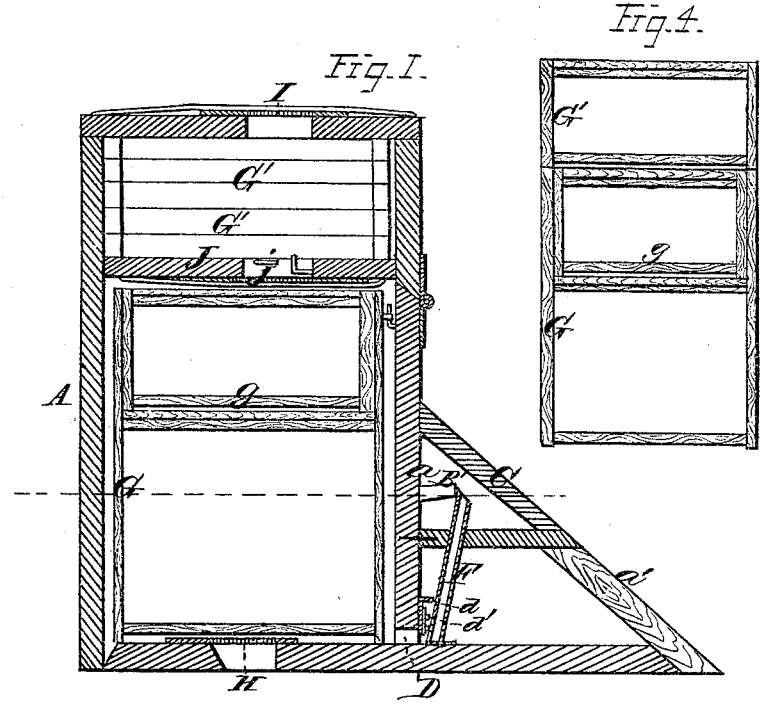
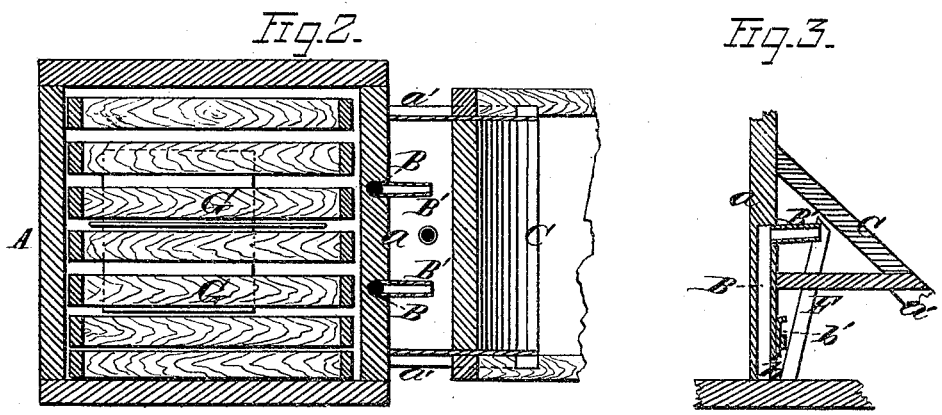
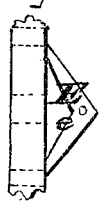
WITNESSES.
Jas. E. Hutchinson
J. W. Mister
INVENTORS.
William J. McCoy
Abram H. McCoy
Edson Bro's
Attorneys

UNITED STATES PATENT OFFICE.

WILLIAM J. McCOY AND ABRAM H. McCOY, OF FORT LITTLETON, PA.

IMPROVEMENT IN MOTH-TRAPS FOR BEE-HIVES.

Specification forming part of Letters Patent No. 151,414, dated May 26, 1874; application filed January 19, 1874.

*To all whom it may concern:*

Be it known that we, WILLIAM J. and A. H. McCOY, of Fort Littleton, in the county of Fulton and State of Pennsylvania, have invented a certain new and useful Improvement in Bee-Hives, of which the following is a full, clear, and exact description, reference being had to the annexed drawing, in which—

Figure 1 is a vertical central section of our improved bee-hive. Fig. 2 is a transverse horizontal section through the dotted line $x\ x$ of Fig. 1, and Fig. 3 is a vertical section through the moth-trap, &c. Figs. 4 and 5 are detached views of our hive.

Corresponding parts in the several figures are designated by corresponding letters.

This invention relates to a certain improvement in bee-hives; and it consists in forming passages or tubes in the front part of the hive communicating with other tubes leading to, and extending into, a trap or receptacle adjusted to the hive, and from which depends a movable tube for forming a connection or communication between the bee-entrance and the trap; and, further, of a triangular alighting-platform for the bees arranged in front of the bee-entrance, and having its divergent ends terminating at the entrances to the passages or tubes in the hive, substantially as hereinafter more fully set forth.

To enable others skilled in the art to which our invention relates to make and use the same, we will proceed to describe it.

In the annexed drawing, A refers to the house of the hive, the front end of which is constituted of two parts hinged together, one of which, $a$, is permanently secured to a board, which constitutes the floor of the hive, and projects some distances in front of the latter, from which projecting part thereof extend diagonal braces or joists $a'\ a'$, which are mortised into the permanent portion of the hive. The house A is not fastened to the board or its floor, so that it can be freely swung up therefrom, after which it is caused to rest upon its stationary portion $a$. In the stationary or front end $a$ of the house are two vertical passages or tubes, B B, one disposed upon each side of the bee-entrance, and communicating with two other tubes, B' B', made of metal, and projecting at right angles therefrom through the hive, and leading to a receptacle, C, into which they extend a short distance, as seen in Fig. 1. Entrances $b$, having slides or doors $b'$, are supplied to the passages B for the admission of the moth to said passages. The moth having entered the passages B, continue their movements upward to and through the tubes B', from which they will be precipitated into the receptacle C, and thus be entrapped. To attract the moth toward the trap C, its ends are punctured so as to allow the rays of light to enter the same. The trap or receptacle C is supported upon the braces or joists $a'\ a'$, and made to fit flush against the hive, the bottom thereof projecting laterally and entering mortises or grooves in the inner sides of the said joists. By thus adjusting the trap to the hive it can be removed when desired, and the moth taken out and destroyed. To entrap the robber bees, close the bee-entrance and open the entrances to the moth tubes or passages B. In front of the bee-entrance D, having a door or slide, $d$, with a smaller one, $d'$, is arranged a triangular alighting-platform, E, for the bees, which has its divergent ends terminating at the moth-tube entrances, and is provided upon its upper surface, at or near its front edge, with an edgewise-disposed plate or guard, $e$, which acts to direct the moth or miller into the said entrances, and also to protect the bee-entrance from being obstructed by water, &c., during rains, which retard the flight of the bees from the hive. F is a movable tube depending from the trap C. This tube has its lower end chamfered, which permits of its being adjusted, so as to fit flush against the larger door $d$, and over the opening of the smaller door $d'$, for the purpose of conducting the drones through the said tube to the trap C after the bees have been hived, the larger door $d$ being raised only high enough to permit the working bees to pass out of the hive. The trap C can also be adjusted from the hive when it is desired to liberate a working bee or bees that may have ascended the tube F with the drones and entered the said trap. G G are the brood-comb frames, which are hinged, each one by hooks and eyes, &c., to the stationary part and floor of the house A, and supplied with smaller detachable ones $g\ g$. G' G' are the surplus comb-frames, which are adjusted to the brood-frames G G by means of pins or projection depending from the same, and entering sockets in the upper surface of the latter-named frames.

By thus uniting all the comb-frames, and securing thereto the stationary part of the house, it will be observed that among the many advantages derived therefrom the following are apparent: The hinged portion of the house, when raised for inspecting the comb-frames, will not disarrange them or disturb the bees or the contents of the frames; all the frames can be inspected by simply lifting the hinged portion of the house; they will have thorough ventilation, and be easy of access to the inspector; afford a great amount of space for the bees, and thereby free the hive from dead air; and, lastly, by reason of their communicating with each other, lessen the amount of heat required to give the required temperature to the hive.

In the bottom and top of the hive are disposed, over openings made therein, perforated metallic slides H I, for regulating the ventilation of the hive. J is a removable board, also supplied with an opening, over which is disposed a perforated metallic slide, $j$.

Having thus described our invention, what we claim, and desire to secure by Letters Patent, is—

1. In combination with the trap C, the movable tube F for opening up a communication with the former and the hive, substantially as and for the purpose specified.

2. The alighting-platform E in front of the bee-entrance, its ends terminating opposite the moth or miller trap or tube openings, and, by the elevation of its edges, forming a guard, $e$, substantially as and for the purposes set forth.

3. The house or hive A $a$ and tubes B and B', in combination with the trap C and ways $a'$ $a'$, substantially as and for the purpose specified.

WILLIAM J. McCOY.
ABRAM H. McCOY.

Witnesses:
ADAM VALLANCE,
WM. BROWN.